(12) United States Patent
Hsu

(10) Patent No.: US 9,853,519 B2
(45) Date of Patent: Dec. 26, 2017

(54) WATERPROOF MOTOR SEAT ON A ROTISSERIE

(71) Applicant: Huang-Hsi Hsu, Taipei (TW)

(72) Inventor: Huang-Hsi Hsu, Taipei (TW)

( * ) Notice: Subject to any disclaimer, the term of this patent is extended or adjusted under 35 U.S.C. 154(b) by 690 days.

(21) Appl. No.: 14/454,985

(22) Filed: Aug. 8, 2014

(65) Prior Publication Data
US 2015/0204478 A1    Jul. 23, 2015

(30) Foreign Application Priority Data

Jan. 21, 2014   (TW) .............................. 103201204 U

(51) Int. Cl.
*H02K 5/10*        (2006.01)
*A47J 37/04*       (2006.01)

(52) U.S. Cl.
CPC .............. *H02K 5/10* (2013.01); *A47J 37/041* (2013.01)

(58) Field of Classification Search
CPC .................................. H02K 5/10; F16M 1/04
USPC .......................... 248/672; 310/86, 88, 85, 89
See application file for complete search history.

(56) References Cited

U.S. PATENT DOCUMENTS

| | | | | |
|---|---|---|---|---|
| 5,598,769 | A  * | 2/1997  | Luebke  | A47J 37/042 99/395 |
| 7,604,367 | B2 * | 10/2009 | Tsao    | F21V 15/01 362/101 |
| 2008/0088192 | A1* | 4/2008  | Hsu     | H02K 5/10 310/88 |
| 2011/0156515 | A1* | 6/2011  | Tsung   | A47J 37/041 310/88 |
| 2015/0340923 | A1* | 11/2015 | Lee     | F04D 17/08 310/71 |

* cited by examiner

*Primary Examiner* — Hanh Nguyen
*Assistant Examiner* — Leda Pham
(74) *Attorney, Agent, or Firm* — Bacon & Thomas, PLLC

(57) ABSTRACT

The present invention is to provide a waterproof motor seat on a rotisserie, which comprises a housing having an opening on one side thereof and an accommodation space formed therein; an element fixing seat smaller than the opening and mounted in the housing on a position corresponding to the opening; a rotating mechanism positioned on an inner side of the element fixing seat; a waterproof washer having one end embedded into a gap formed between the element fixing seat and the opening, and the other end extending outside of the gap; and a packing ring securely mounted onto the housing and abutting against the other end of the waterproof washer and an outer side of the element fixing seat; such that the waterproof washer can be deformed and tightly packed within the gap for enabling the element fixing seat and the housing to be watertightly joined together into one body.

14 Claims, 6 Drawing Sheets

US 9,853,519 B2

WATERPROOF MOTOR SEAT ON A ROTISSERIE

FIELD OF THE INVENTION

The present invention relates to motor seat, more particularly to a waterproof motor seat on a rotisserie, which comprises a housing having an opening on one side thereof and an accommodation space formed therein; an element fixing seat smaller than the opening and mounted in the housing on a position corresponding to the opening; a rotating mechanism positioned on an inner side of the element fixing seat; a waterproof washer having one end embedded into a gap formed between the element fixing seat and the opening and the other end extending outside of the gap; and a packing ring securely mounted onto the housing and abutting against the other end of the waterproof washer and an outer side of the element fixing seat; such that the waterproof washer can be deformed and tightly packed within the gap for enabling the element fixing seat and the housing to be watertightly joined together into one body

BACKGROUND OF THE INVENTION

Recently, the living standards of people are greatly raised. To relieve the pressure from work, people pay higher attention on leisure activities in their spare time in which barbecue is the most popular activity suitable for whole family members, relatives and good friends to join in. Particularly, among European or American families who own spacious garden, barbecue has become the most basic leisure and social activity. Therefore, most European or American families pay great and particular attention to a variety of rotisseries required in barbecue activities.

Referring to FIG. 1, the common rotisserie of rotary type 60 in the market is provided with a roast stove 61 ⊔ shaped in cross section. Inside the roast stove 61 there is provided an accommodation space 611 to accommodate barbecue members such as a barbecue net, a gas stove or pieces of charcoal (not shown). A holding bracket 62 and another holding bracket 63 on which a motor seat 64 may be mounted are respectively provided on both opposite side walls of the roast stove 61. A rotary shaft hole 642 is provided on one side of the motor seat 64. Inside the motor seat 64 there is provided a motor (not shown) which is supplied with electricity required in normal operation through a power supply wire 643 to drive a rotary shaft (not shown). A fork rod 70 may be inserted into the rotary shaft hole 642 corresponding to the rotary shaft. One end of the fork rod 70 connects with the rotary shaft while the other end of the fork rod 70 rides over a notch 624 of the holding bracket 62. A pair of claws 651 are provided on a suitable position thereof whereby after an object to be roasted 80 (a whole chicken as shown) is forked and fixed by the fork rod 70 and the claws 651, the motor seat 64 can drive the fork rod 70 to rotate. The object to be roasted 80 is rotated and roasted through the gas or charcoal inside the roast stove 61.

Though so, the barbecue activity is normally arranged to proceed in a good weather or circumstance. However, the weather is unpredictable. Particularly, in spring or summer when the barbecue activities proceed frequently, under the convection effect of the front and the cloud system, the barbecue activities originally arranged to proceed in normal weather will often be interrupted or stopped by an unexpected heavy rain. Variety of roasting foods too late to be gathered up may be uneatable after getting soaked in the rain. The charcoal on roasting may be out of use after exposing to the rain. Although the barbecue activity will be spoiled by such situations, however the worst to be worried is that after the rotisserie of rotary type 60 gets soaked, rain water will splash or seep into the motor seat 64 along the hole or gap of the motor seat 64 to incur the problem of short circuit or electricity leakage of the motor and circuit inside the motor seat 64. Such short circuit or electricity leakage may endanger the user's property or body. Furthermore, since in European countries or USA where the barbecue activity is popular, the household uses a voltage of 220~240 volts, once short circuit or electricity leakage occurs, the harm to the user will get more serious. Therefore, recently a few countries made safety rules for regulating outdoor electric appliances and requiring them to have waterproof function.

In view of the above, the inventor has designed and manufactured a waterproof motor seat as shown in FIG. 2 to solve the problems of short circuit and electricity leakage. The waterproof motor seat comprises a housing 10, a cover body 20 and a motor 30. On one side of the housing 10 there is provided an opening 11 in which an accommodation space 111 is formed for the motor 30 to be fixed therein. A waterproof washer 12 made of elastic material is provided on the end edge of the housing 10 adjacent to the opening 11. A groove 121 is cut on one side of the waterproof washer 12 facing the housing 10 for the waterproof washer 12 to sleeve on the end edge of the opening 11. A plurality of screws 40 pass through the corresponding holes 22 provided on the cover body 20 to fix the cover body 20 onto the housing 10. The cover body 20 covers the other side of the waterproof washer 12 and its end edge 21 abuts against the outer edge of the waterproof washer 12 so that when the cover body 20 and the housing 10 are joined into one body, both sides of the cover body 20 respectively attach to the cover body 20 and the housing 10 to attain a watertight position. A rotary shaft hole 23 is formed on the cover body 20 at a position corresponding to an axle seat 31 of the motor 30. A waterproof collar 25 is embedded in the periphery of the rotary shaft hole 23. When the cover body 20 and the housing 10 are joined into one body, the inner edge of the waterproof collar 25 can watertightly abut against the outer edge of the axle seat 31 and the groove 251 on the outer edge of the axle seat 31 can watertightly abut against the periphery of the rotary shaft hole 23 while the rotary shaft 32 can extend outside of the rotary shaft hole 23 from the axle seat 31.

Although the waterproof motor seat as shown in FIG. 2 has waterproof effect to some degree, in the process of actual production and assembly, the groove 121 provided on one side of the waterproof washer 12 facing the housing 10 is required to be configured and dimensioned to allow it to be precisely sleeved on the end edge of the opening 11 of the housing 10. Furthermore, when the cover body 20 is fixed onto the housing 10 by means of these screws 40, the end edge 21 of the cover body 20 is also required to be precisely abutted against the outer edge of the waterproof washer 12 so that when the cover body 20 and the housing 10 are joined into one body, both sides of the waterproof washer 12 will respectively attach to the cover body 20 and the housing 10 to attain a watertight position. However, the inventor finds that in the process of actual production and assembly, the elasticity of the waterproof washer 12 or the insufficiency of production precision will often make the groove 121 difficult to align with the end edge of the opening 11. The assembly operators will carelessly fix the cover body 20 onto the housing 10 when the groove 121 doesn't align with the end edge of the opening 11 yet. Consequently, the waterproof washer 12 will deform between the cover body 20 and the housing 10 as a result of which the inner wall of the groove 121 can not evenly and watertightly contact with the surface of the end edge of the housing 10 and thus a gap is formed therebetween. Finally, the waterproof washer 12 can not fulfill its supposed waterproof effect.

BRIEF SUMMARY OF THE INVENTION

To obviate the drawbacks of the motor seat on the rotisserie as disclosed above which could not achieve the effective waterproof, the inventor made efforts on research and experiments for a long time to have eventually developed and designed a waterproof motor seat on a rotisserie to facilitate the operators to rapidly assemble the motor seat and effectively ensure the waterproof effect, preventing from the problems of short circuit or electricity leakage due to seepage and further effectively preventing it from endangering the user's property or body.

One object of this invention is to provide a waterproof motor seat on a rotisserie comprising a housing, an element fixing seat, a rotating mechanism, a waterproof washer and a packing ring wherein the housing has an opening on one side thereof, an accommodation space being formed in the housing; the element fixing seat is smaller than the opening so as to be capable of passing through the opening and securely mounted in the housing on a position corresponding to the opening, one turn of gap being formed between the outer edge of the element fixing seat and the inner edge of the opening, and an axle hole being formed on the element fixing seat; the rotating mechanism is positioned on the inner side of the element fixing seat and configured in such a manner that when the element fixing seat is securely mounted on the housing, except that the rotating mechanism corresponds to the accommodation space and the outer side of the element fixing seat faces the opening, an output axle of the rotating mechanism can pass through the axle hole to extend outside of the element fixing seat; the waterproof washer is made of elastic material, one end of the washer being capable of being readily embedded into the gap, and the other end thereof extending outside of the gap; and the packing ring is securely mounted onto the housing on a position corresponding to the opening, the inner side of the packing ring being capable of abutting against the other end of the waterproof washer and the outer side of the element fixing seat for the waterproof washer to deform under pressure and evenly and watertightly pack within the gap whereby the element fixing seat and the housing can be watertightly joined into one body. Thus, since there is utterly no need to provide any groove on one side of the waterproof washer facing the housing, it is easy to manufacture. In the process of actual assembly, the waterproof washer is not necessarily precisely sleeved on the end edge of the housing adjacent to the opening. It is only required to embed one end of the waterproof washer into the gap such that when the packing ring and the element fixing seat are fixed onto the housing, the inner side of the packing ring respectively abuts against the other end of the waterproof washer and the outer side of the element fixing seat to further enable the waterproof washer to be evenly and watertightly packed in the gap after deformation under pressure to watertightly join the element fixing seat and the housing into one body. Therefore, in the process of actual production and assembly, the assembly speed will not be affected by the elasticity of the waterproof washer itself or the insufficiency of the manufacturing precision. Furthermore, the waterproof motor seat of this invention can effectively achieve its supposed waterproof effect and ensure the prevention of short circuit or electricity leakage.

Another object of this invention is to provide a waterproof motor seat further comprising a supporting board securely mounted onto the outer side of the element fixing seat and configured in such a manner that the supporting board is assembled on top of a rotisserie and the supporting board is kept away from the packing ring at a distance to ensure that the heat it absorbs from the rotisserie will not be directly transmitted to the packing ring, the element fixing seat or the housing to further prevent the electric elements in the housing from overheating or damage.

For further appreciation and understanding of the objects, shapes, structure characteristics and the effects thereof, a detailed description of the embodiments in corporation with figures is given as follows wherein:

DETAILED DESCRIPTION OF THE INVENTION

Figure 1:
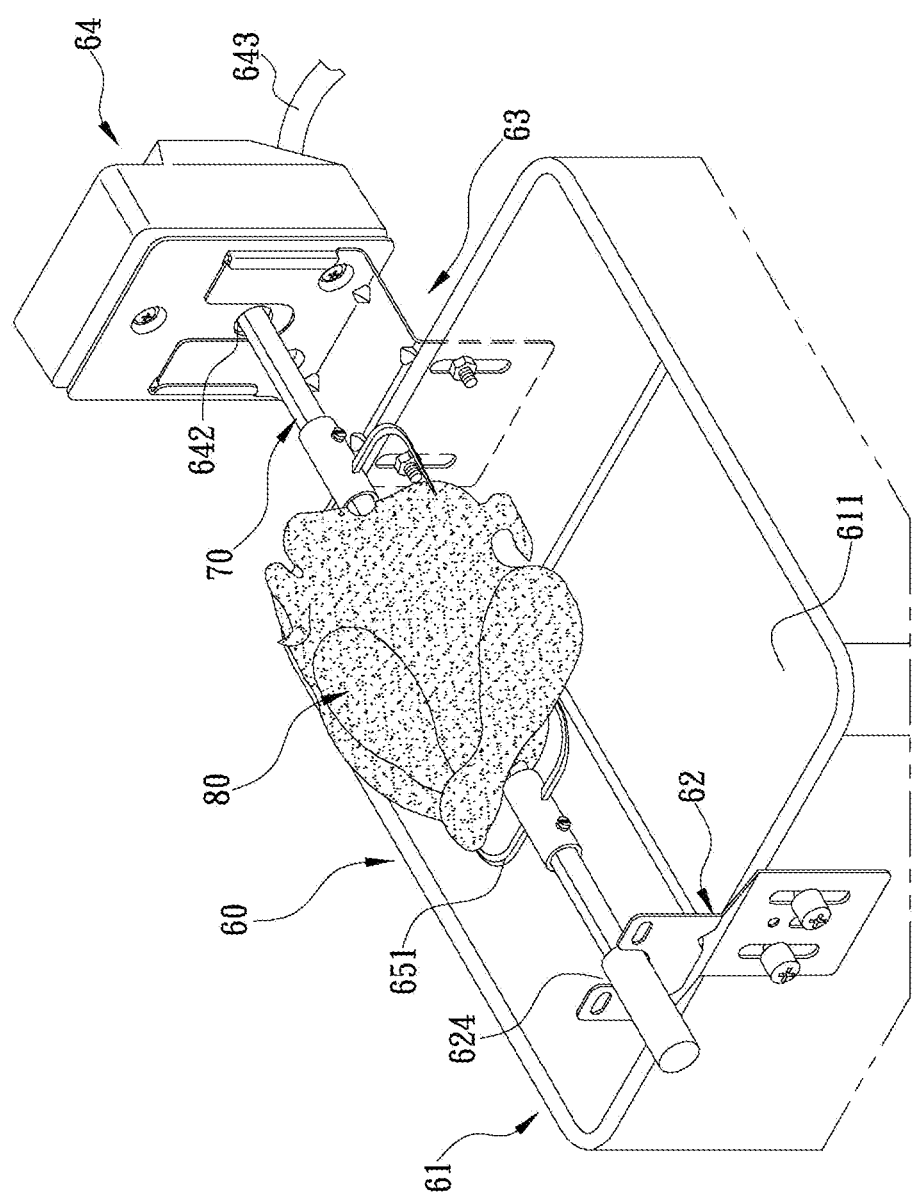
FIG. 1 is schematic view showing the structure of the conventional rotisserie of rotary type.
Figure 2:
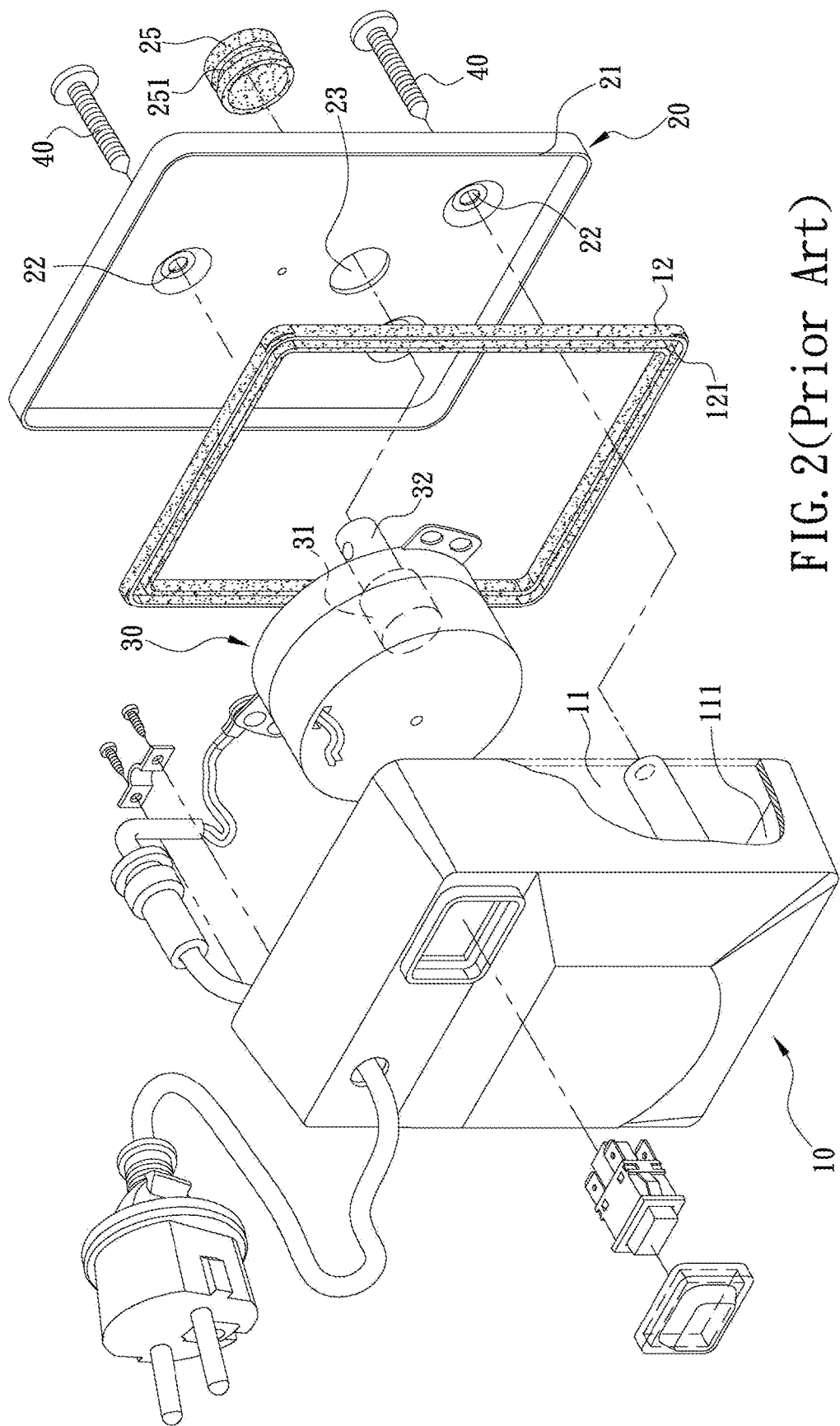
FIG. 2 is an explosive perspective view schematically showing a motor seat on a rotisserie designed and manufactured by the inventor.
Figure 3:
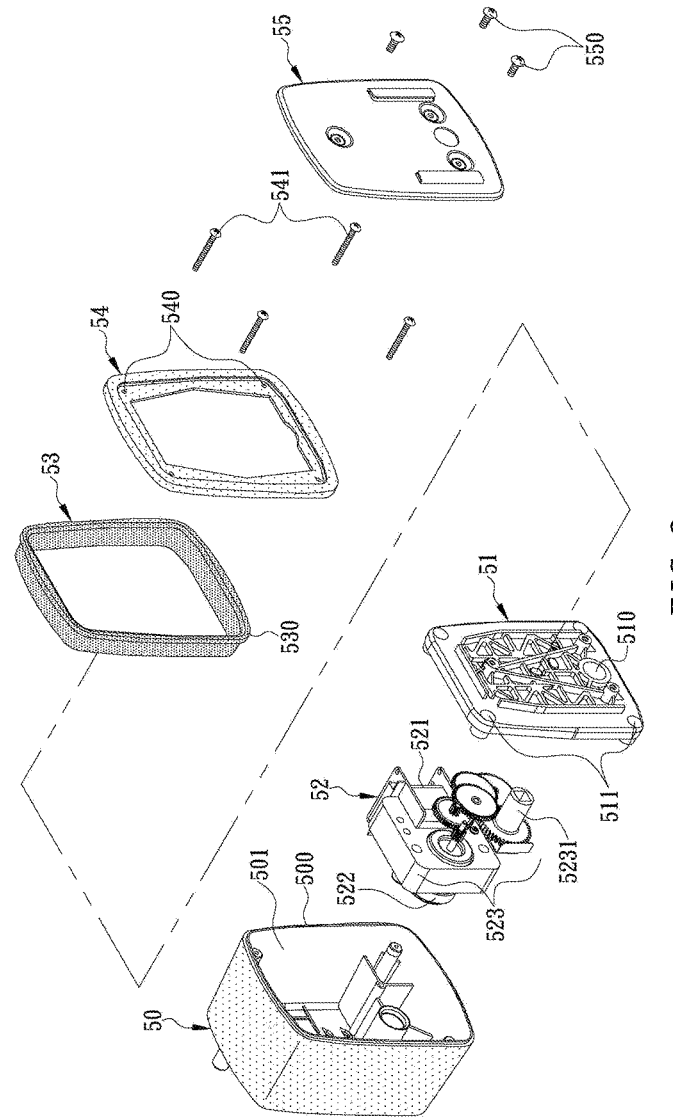
FIG. 3 is a schematic explosive perspective view of this invention.
Figure 4:
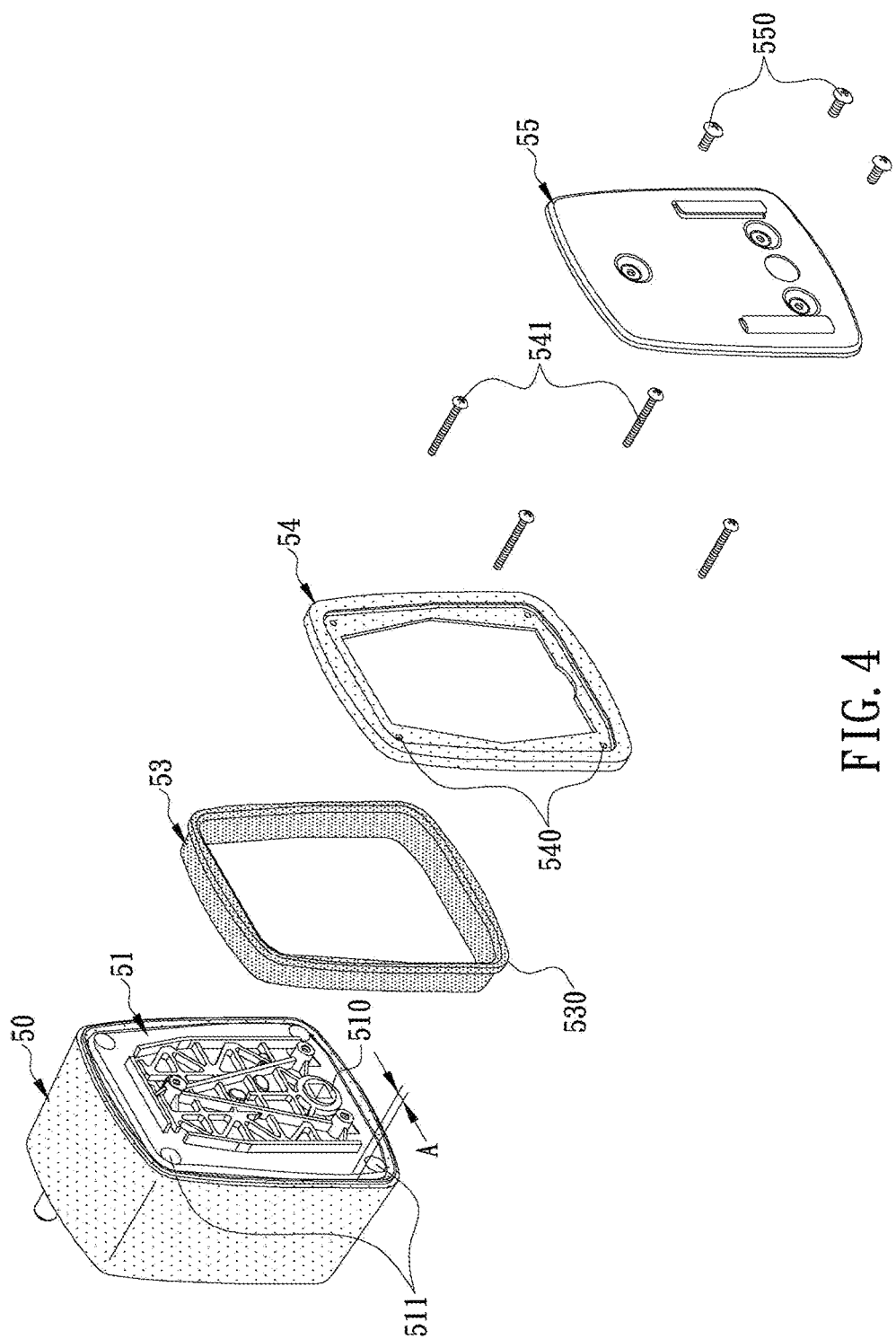
FIG. 4 is a schematic explosive perspective view of this invention in a position after an element fixing seat is positioned within a housing body.

Referring to FIG. 3, this invention is a waterproof motor seat on a rotisserie comprising a housing 50, an element fixing seat 51, a rotating mechanism 52, a waterproof washer 53, a packing ring 54 and a supporting board 55 wherein the housing 50 has an opening 500 on one side thereof, an accommodation space 501 being formed in the opening 500. Referring to FIGS. 3 and 4, the element fixing seat 51 is smaller than the opening 500 so as to be capable of passing through the opening 500 and securely mounted in the housing 50 on a position corresponding to the opening 500. One turn of gap A is formed between the outer edge of the element fixing seat 51 and the inner edge of the opening 500, and an axle hole 510 is formed on the element fixing seat 51.

Further referring to FIGS. 3 and 4, the rotating mechanism 52 positioned on the inner side of the element fixing seat 51 comprises a rectifier 521, a DC motor 522 and a reduction gear set 523 wherein the rectifier 521 serves to transform DC into AC, the DC motor 522 electrically connects with the rectifier 521 to receive DC for the rotating axle thereof (not shown) to be rotated, and the reduction gear set 523 engages with the rotating axle of the DC motor 522 to transmit power to the output axle 5231 after lowering the rotation speed transmitted by the rotating axle and increasing the torque transmitted by the rotating axle. Additionally, when the element fixing seat 51 is positioned in the housing 50 on a position corresponding to the opening 500, except that the rotating mechanism 52 corresponds to the accommodation space 501 and the outer side of the element fixing seat 51 faces the opening 500, an output axle 5231 of the rotating mechanism 52 can pass through the axle hole 510 to extend outside of the element fixing seat 51. The embodiment as disclosed above is one of the preferred embodiments of this invention and therefore the structure characteristics of the rotating mechanism 52 is not limited thereto. According to the actual need, the rectifier 521 may be provided outside of the housing 50, the reduction gear set 523 may be omitted and only a motor is provided in the housing 50 such that the output axle 5231 may be rotated when the motor receives electric power.

Figure 5:
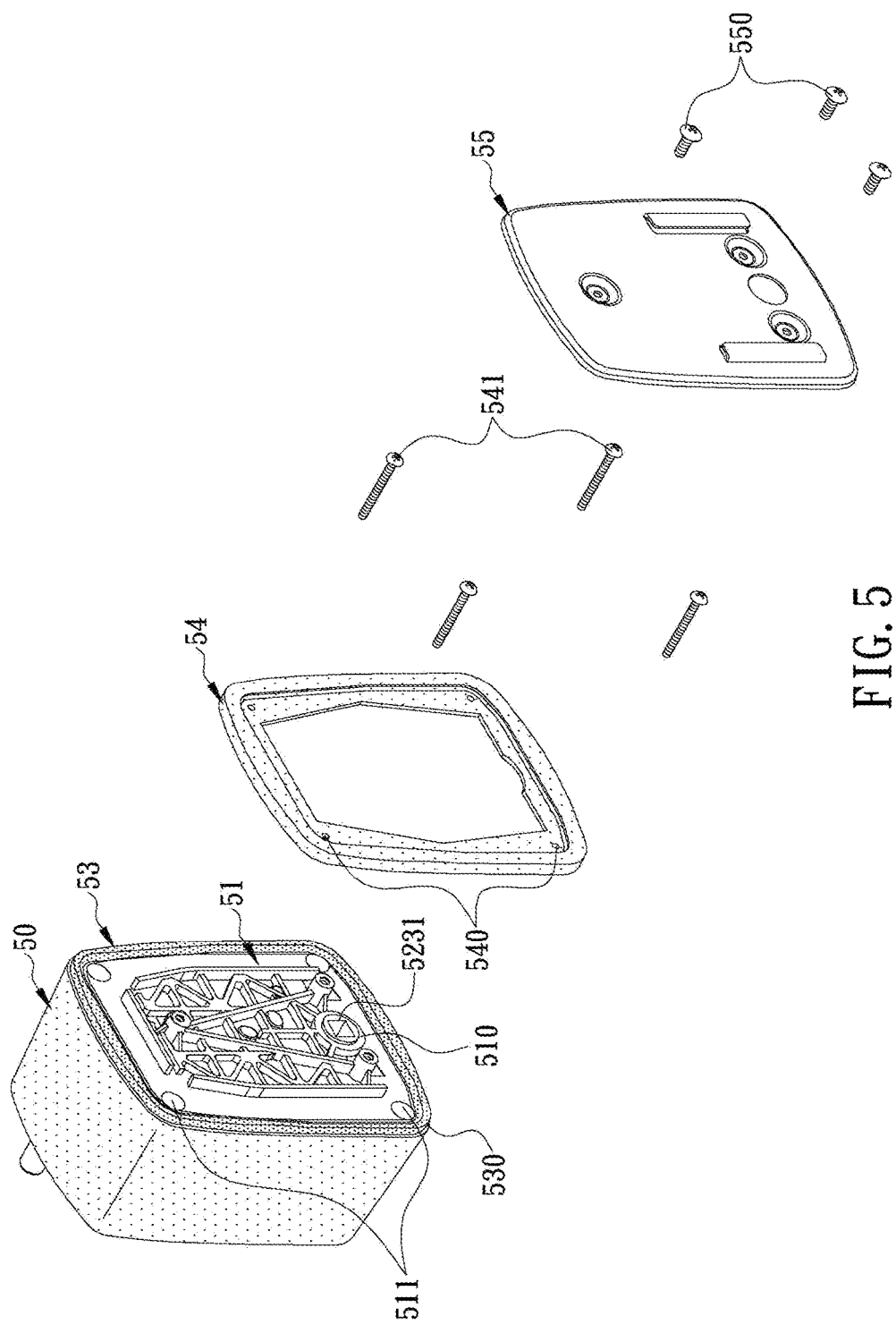
FIG. 5 is a schematic explosive perspective view of this invention in a position after a waterproof washer is embedded into a gap between the element fixing seat and the cover body.

Further referring to FIGS. 4 and 5, the waterproof washer 53 is made of elastic material, one end of the waterproof washer 53 being capable of being readily embedded into the gap A, and the other end thereof extending outside of the gap A. The embodiment as disclosed above is one of the preferred embodiments of this invention and therefore the structure characteristics of the waterproof washer 53 is not limited thereto. According to the actual need, a flange 530 is radially provided on the outer (and/or inner) edge of the other end of the waterproof washer 53. As shown in FIG. 5, when one end of the waterproof washer 53 is embedded into the gap A, one side of the flange 530 can abut against the end edge of one side of the housing 50 (and/or the edge of the outer side of the element fixing seat 51).

Further referring to FIG. 5, the packing ring 54 is securely mounted on the outer side of the element fixing seat 51 by means of a plurality of first screw bolts 541. Each of the first screw bolts 541 sequentially passes through the through holes 540 corresponding thereto on the packing ring 54 and the threaded holes 511 corresponding thereto on the element fixing seat 51 to be locked inside the housing 50, the packing ring 54 and the element fixing seat 51 being simultaneously securely mounted onto the housing 50 on the position corresponding to the opening 500 (as shown in FIG. 3). Thus, the inner side of the packing ring 54 can abut respectively against the other end of the waterproof washer 53 (or the flange 530) and the outer side of the element fixing seat 51 such that after deforming under pressure, the waterproof washer 53 is evenly and watertightly packed between the end edge of one side of the housing 50 and the inner side of the packing ring 54 and into the gap A (as shown in FIG. 4) as a result of which the element fixing seat 51 and the housing 50 can be watertightly joined into one body to ensure that rain water will not pass between the end edge of one side of the housing 50 and the inner side of the packing ring 54 and through the gap A into the housing 50. Furthermore, owing to the provision of the corresponding threaded hole 511 on the element fixing seat 51, during the first screw bolts 541 fixes the packing ring 54 and the element fixing seat 51 onto the housing 50, each of the first screw bolts 541 and the corresponding threaded hole 511 which are screwed tight together may also ensure the rain water will not seep into the housing 50 through the corresponding threaded hole 511. Therefore, the short circuit or electricity leakage of the electric elements of the rotating mechanism 52 inside the housing 50 (such as the rectifier 521 or DC motor 522 as shown in FIG. 3) due to the seep of rain water can be effectively avoided.

Figure 6:
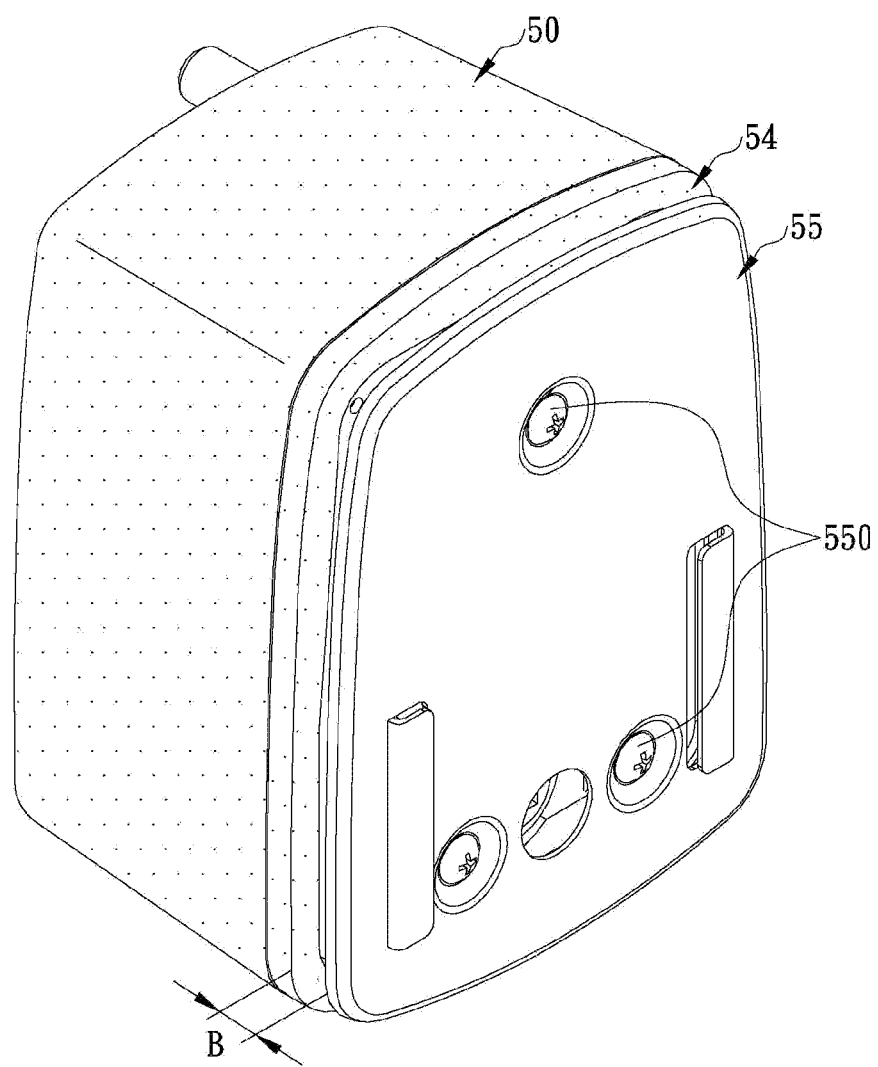
FIG. 6 is an assembly view of this invention.

Referring to FIGS. 3, 5 and 6, the supporting board 55 is securely mounted onto the outer side of the element fixing seat 51 by means of a plurality of second screw bolts 550 configured in such manner that the supporting board 55 is assembled on top of a rotisserie (not shown) and the supporting board 55 is kept away from the packing ring 54 at a predetermined distance B to ensure it to absorb heat from the rotisserie, preventing heat to be directly transmitted to the packing ring 54, the element fixing seat 51 or the housing 50 and further preventing the electric elements in the rotating mechanism 52 inside the housing 50 (such as the rectifier 521 or DC motor 522 as shown in FIG. 3) from damage due to overheating.

To ensure rain water will not seep into the housing 50 through the axle hole 510, in this embodiment, a waterproof collar (not shown) is further provided in the axle hole 510. The surface of the inner side of the waterproof collar is designed as wavy such that when the output axle 5231 of the reduction gear set 523 passes through the axle hole 510 to expose outside of the element fixing seat 51, a few watertight collars can be formed on the outer edge of the output axle 5231 to ensure that rain water will not seep into the housing 50 through the gap between the axle hole 510 and the output axle 5231. Therefore, the problem of short circuit or electricity leakage of the electric elements in the rotating mechanism 52 (such as rectifier 521 or DC motor 522) is avoidable effectively.

Accordingly, since there is utterly no need to provide any groove on one side of the waterproof washer 53 facing the housing 50, it is easy to manufacture. In the process of actual assembly, the waterproof washer 53 is not required to be precisely sleeved on the end edge of the housing 50 adjacent to the opening 500. It only needs to embed one end of the waterproof washer 53 into the gap A formed between the outer edge of the element fixing seat 51 and the inner edge of the opening 500 such that when the first screw bolts 541 sequentially fixes the packing ring 54 and the element fixing seat 51 onto the housing 50, the inner side of the packing ring 51 respectively abuts against the other end of the waterproof washer 53 (or the flange 530) and the outer side of the element fixing seat 51 to further enable the waterproof washer 53 to be evenly and watertightly packed between the end edge of one side of the housing 50 and the inner side of the packing ring 54 and in the gap A after deformation under pressure to watertightly join the element fixing seat 51 and the housing 50 into one body. Therefore, in actual manufacturing and assembling process, the waterproof washer 53 will not misalign with the gap A due to the elasticity of the waterproof washer 53 itself or the insufficiency of the manufacturing precision. Thus, the operator can rapidly accomplish the assembly of the waterproof motor seat of this invention. Furthermore, it can ensure that after deforming under pressure between the housing 50, the element fixing seat 51 and the packing ring 54, the waterproof washer 53 can evenly and watertightly fill the gap among the housing 50, the element fixing seat 51 and the packing ring 54 to effectively attain its expected waterproof effect. Moreover, it can ensure the prevention of short circuit or electricity leakage of the waterproof motor seat of this invention, thus completely meeting the waterproof requirements as specified in the relevant safety regulations.

While the invention herein disclosed has been described by means of specific embodiments, numerous modifications and variations could be made thereto by those skilled in the art without departing from the scope of the invention set forth in the claims.

What is claimed is:
1. A waterproof motor seat on a rotisserie comprising:
a housing having an opening on one side thereof and an accommodation space formed therein;
an element fixing seat smaller than said opening, capable of passing through said opening and securely mounted in said housing on a position corresponding to said opening, wherein a gap is formed between an outer edge of said element fixing seat and an inner edge of said opening, and an axle hole is formed on said element fixing seat and a plurality of threaded holes are provided on said element fixing seat;

a rotating mechanism positioned on an inner side of said element fixing seat and configured in such a manner that, when said element fixing seat is securely mounted on said housing, said rotating mechanism is within the accommodation space, an outer side of said element fixing seat faces outside of said opening, and an output axle of said rotating mechanism is configured to pass through said axle hole and extend outside of said element fixing seat;

a waterproof washer made of elastic material and having one end embedded into said gap and the other end extending outside of the gap, wherein an outer or inner edge of the other end of said waterproof washer is radially provided with a flange, whereby, when one end of said waterproof washer is completely embedded in said gap, an inner side of said flange can abut against an end edge on one side of said housing or an outer edge of said element fixing seat; and a packing ring securely mounted onto said housing on a position corresponding to said opening, wherein an inner side of said packing ring abuts against the other end of said waterproof washer and the outer side of said element fixing seat for enabling said waterproof washer to deform under pressure and evenly and watertightly pack within the gap, whereby said element fixing seat and said housing are configured to be watertightly joined into one body, wherein a plurality of through holes are provided on said packing ring, and said packing ring is positioned on the outer side of said element fixing seat by means of a plurality of first screw bolts, and each of said first screw bolts sequentially passes through said through hole and said threaded hole corresponding thereto and is secured inside said housing, so as to simultaneously and securely mount said packing ring and said element fixing seat onto said housing at a position corresponding to said opening.

2. A waterproof motor seat on a rotisserie as claimed in claim 1, wherein said rotating mechanism comprises a motor, and said motor drives the output axle to rotate when receiving electric power.

3. A waterproof motor seat on a rotisserie as claimed in claim 2, wherein a plurality of through holes are provided on said packing ring, a plurality of threaded holes are provided on said element fixing seat, said packing ring is positioned on the outer side of said element fixing seat by means of a plurality of first screw bolts, and each of said first screw bolts sequentially passes through said through hole and said threaded hole corresponding thereto and is secured inside said housing, so as to simultaneously and securely mount said packing ring and said element fixing seat onto said housing at a position corresponding to said opening.

4. A waterproof motor seat on a rotisserie as claimed in claim 3 further comprising a supporting board securely mounted onto the outer side of said element fixing seat and configured in such a manner that said supporting board is configured to be assembled on top of said rotisserie.

5. A waterproof motor seat on a rotisserie as claimed in claim 4, wherein said supporting board is securely mounted onto the outer side of said element fixing seat through a plurality of second screw bolts.

6. A waterproof motor seat on a rotisserie as claimed in claim 5, wherein said supporting board is kept away from said packing ring at a distance.

7. A waterproof motor seat on a rotisserie as claimed in claim 1, wherein said rotating mechanism comprises a rectifier, a DC (Direct Current) motor and a reduction gear set, said rectifier is used to transform DC into AC (Alternating Current), said DC motor is electrically connected to said rectifier for receiving DC and drives a rotating axle thereof to rotate, said reduction gear set is engaged with said rotating axle for transmitting power to said output axle after lowering rotation speed transmitted by said rotating axle and increasing the torque transmitted by said rotating axle.

8. A waterproof motor seat on a rotisserie as claimed in claim 1, wherein a plurality of through holes are provided on said packing ring, a plurality of threaded holes are provided on said element fixing seat, said packing ring is positioned on the outer side of said element fixing seat by means of a plurality of first screw bolts, and each of said first screw bolts sequentially passes through said through hole and said threaded hole corresponding thereto and is secured inside said housing, so as to simultaneously and securely mount said packing ring and said element fixing seat onto said housing at a position corresponding to said opening.

9. A waterproof motor seat on a rotisserie as claimed in claim 8 further comprising a supporting board securely mounted onto the outer side of said element fixing seat and configured in such a manner that said supporting board is configured to be assembled on top of said rotisserie.

10. A waterproof motor seat on a rotisserie as claimed in claim 9, wherein said supporting board is securely mounted onto the outer side of said element fixing seat through a plurality of second screw bolts.

11. A waterproof motor seat on a rotisserie as claimed in claim 10, wherein said supporting board is kept away from said packing ring at a distance.

12. A waterproof motor seat on a rotisserie as claimed in claim 1 further comprising a supporting board securely mounted onto the outer side of said element fixing seat and configured in such a manner that said supporting board is configured to be assembled on top of said rotisserie.

13. A waterproof motor seat on a rotisserie as claimed in claim 12, wherein said supporting board is securely mounted onto the outer side of said element fixing seat through a plurality of second screw bolts.

14. A waterproof motor seat on a rotisserie as claimed in claim 13, wherein said supporting board is kept away from said packing ring at a distance.

* * * * *